March 6, 1973 J. P. COLBURN 3,719,118
PIANO INSTRUCTION DEVICE
Filed July 13, 1971 3 Sheets-Sheet 1
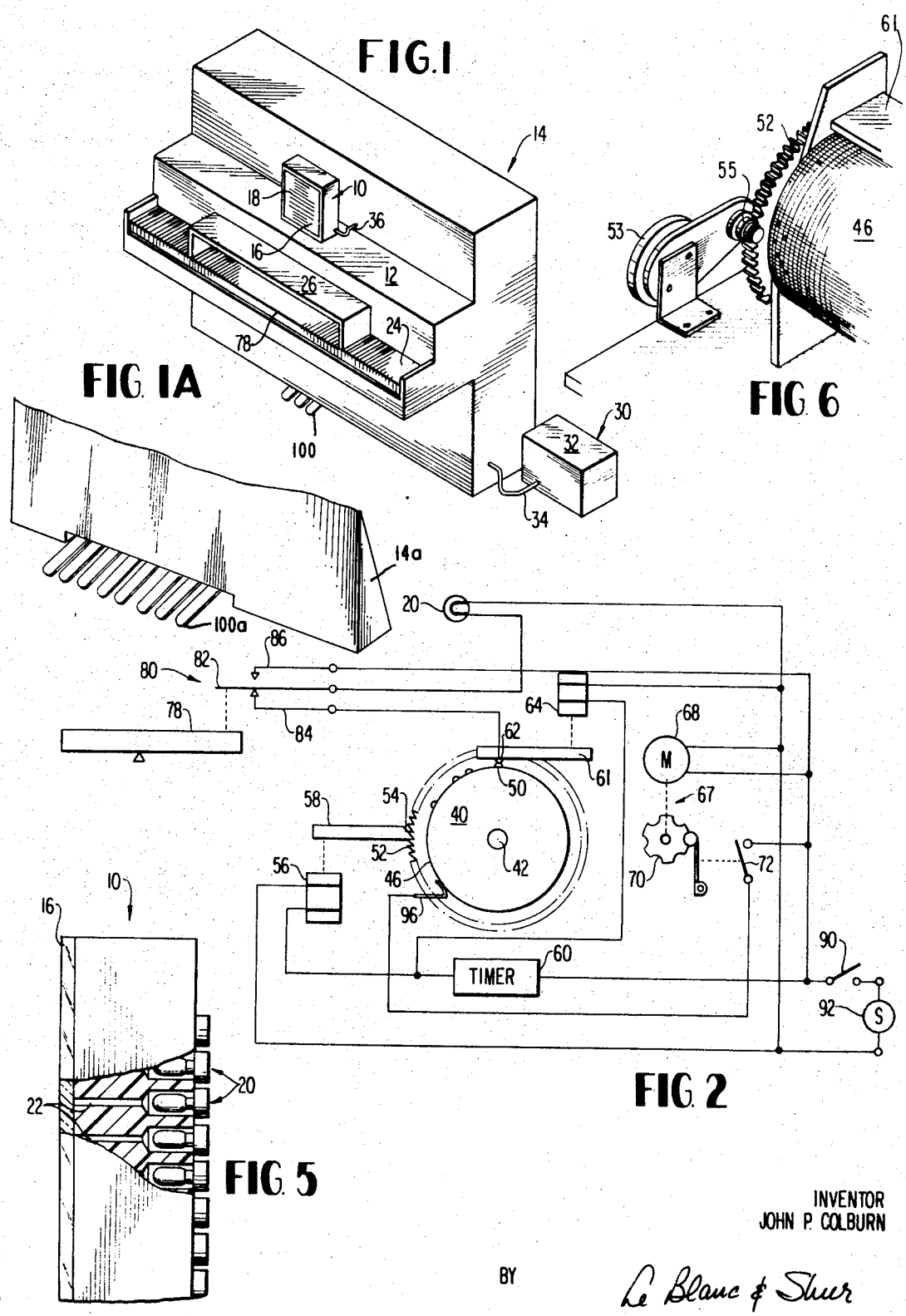
INVENTOR
JOHN P. COLBURN
BY
Le Blanc & Shur
ATTORNEYS March 6, 1973   J. P. COLBURN   3,719,118
PIANO INSTRUCTION DEVICE Filed July 13, 1971   3 Sheets-Sheet 2

March 6, 1973   J. P. COLBURN   3,719,118
PIANO INSTRUCTION DEVICE
Filed July 13, 1971   3 Sheets-Sheet 3

United States Patent Office 3,719,118
Patented Mar. 6, 1973

3,719,118
PIANO INSTRUCTION DEVICE
John P. Colburn, 360 Sherman Ave.,
Council Bluffs, Iowa
Continuation-in-part of application Ser. No. 99,027, Dec. 17, 1970. This application July 13, 1971, Ser. No. 162,122
The portion of the term of the patent subsequent to Sept. 12, 1989, has been disclaimed
Int. Cl. G09b 15/08
U.S. Cl. 84—478
10 Claims

ABSTRACT OF THE DISCLOSURE

A device to teach pupils to read music and identify notes on a keyboard instrument and promote efficiency in the performance of musical exercises is presented. The device includes a scale representation visually displaying notes as flashing lights, a keyboard representation visually displaying keys to be played as flashing lights said representations selectively controlled by an electromechanical signal device for successively displaying preselected combinations of notes on the scale and/or keys on the keyboard for a preselected period of time. The keyboard and pedals of the instrument if desired, are adapted to interrupt the flashing note-lights and key-lights to display a continuous light only when the correct key or pedal is depressed.

---

This application is a continuation-in-part of my copending patent application Ser. No. 99,027, filed Dec. 17, 1970.

This invention relates to a device for teaching a pupil to read music and play keyboard instruments. The device is intended for use with any piano or organ of conventional design. The device functions to display a particular musical exercise for the student, and to indicate whether the exercise has been correctly performed. The device also includes a capability for displaying, in sequence, a series of musical exercises.

Various types of instruction devices for use with keyboard instruments are well known. Certain of these devices utilize a visual scale depicting notes. For example, a common device monitors a student's keyboard, recording the notes played and computing errors made. In another device, the instructor and the student simultaneously play the same exercise, and the device compares the notes played and computes deviations resulting from student errors.

The prior instruction devices known do not meet the student's needs for efficient instruction. Errors should be indicated to the student as the exercise is played, so that the student may visually observe the incorrectly played notes. In addition, no prior devices known may be utilized to display successive musical exercises at timed intervals so that the instructor may program the teaching device for a series of exercises. Also, no device known combines the above features with the capability of use with either advanced or beginning students, either in the instructor's presence, or without the instructor, to perform a teaching function efficiently and dependably.

The deficiencies and inadequacies of prior teaching devices are overcome by the instant invention wherein a screen is mounted on the piano music rack which screen contains illumination elements oriented to display musical notes on a scale inscribed thereon. A keyboard representation is mounted over the keys of the instrument, which keyboard representation contains illumination elements oriented to display the keys to be played. A rotatable drum containing oriented electrical contacts is utilized to energize selected lights corresponding to the particular notes or keys to be played, and switches carried by each key are adapted to indicate in the light display on a screen or on a keyboard when the correct key is depressed.

In a preferred embodiment, a flasher is coupled in an electric circuit to the screen lights on the scale representation and on the keyboard representation and to each key so that the muscial exercise to be played may be displayed as flashing lights on a musical scale or as flashing lights under representative keys disposed above the keyboard key to be played. As each key is correctly depressed, the flasher circuit is bypassed and a steady light is displayed in the corresponding note location on the scale and on the keyboard. The device also includes a selector switch to permit the display of notes to be played on the illuminated scale, on the illuminated keyboard, or on both simultaneously. The signal device is also designed to display the signals for a preselected period of time. At the expiration of the time alloted the signal device changes the exercise display to a different display. In this way, a series of exercises may be displayed in time sequence for the student to play.

Accordingly, it is an object of this invention to provide a device for use instructing students in reading sheet music and playing thereof on keyboard instruments.

It is another object to provide a device for use in instructing students in recognizing the instrument key corresponding to a note displayed on sheet music or to a tone played on an instrument.

It is another object to provide a portable self-contained electro-mechanical teaching device for use by a pupil either with or without the teacher being present, adaptable for use either by a beginner or an advanced pupil to promote sight reading, to promote playing by ear, and instrument proficiency.

It is further object to provide a teaching device for keyboard instruments such as the piano and organ, which device visually displays notes or keys to be played and signals a student when each note or key is correctly played.

It is another object to provide a teaching device for piano and organ which displays as flashing lights on a musical scale screen or as flashing lights on a keyboard representation screen oriented over the instrument keyboard, a series of exercises to be played in timed sequence so that when each note or key is correctly played within the time period allotted the flashing light is replaced by a steady light.

It is yet another object to provide a reading and teaching device for keyboard instruments adapted to display on a representation of a musical scale staff, flashing lights corresponding to notes to be played within a preset period after which they are automatically replaced by a different set of notes for another period of time.

It is yet another object to provide a teaching device for keyboard instruments adapted to display, on a representation of a keyboard oriented over the instrument keyboard, flashing lights corresponding to keys to be played within a preset time period after which they are automatically replaced by a different set of keys to be played for another period of time.

It is a further object to provide a combined reading and teaching device for keyboard instruments adapted to display either on a representation of a musical scale staff, on a representation of an instrument keyboard, or on both simultaneously, flashing lights corresponding to exercises to be played within a preset time period after which they are automatically replaced by a different set of exercises for another period of time.

These and other objects will become readily apparent with reference to the following drawings and description wherein:

FIG. 1 is a plan view of a piano with the device of this invention mounted thereon.

FIG. 1A is a fragmentary perspective view illustrating the pedals of an organ.

FIG. 2 is a schematic illustration of the device of this invention.

FIG. 5 is a partial sectional view of the scale screen on which the visual problems may be displayed.

FIG. 6 is a plan view of an optional drive for the preprogrammed signal unit.

Figure 3:
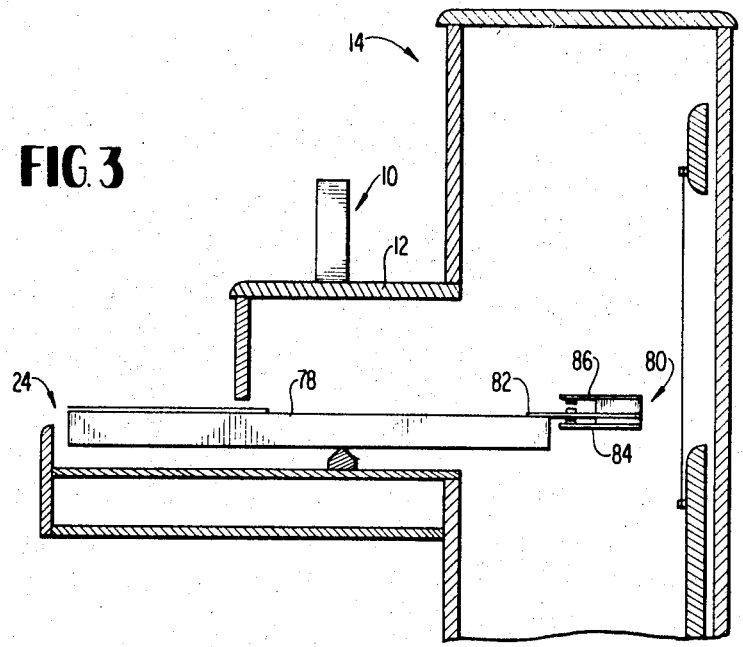
FIG. 3 is a fragmentary sectional view showing a portion of a piano of FIG. 1.

With attention to FIGS. 1 and 5 the device of this invention includes a visual scale screen 10 which is adapted to be mounted on the music rack 12 of a piano 14. The screen 10 includes a face 16 which preferably has a base and a treble staff 18 inscribed thereon. A subminiature light bulb 20 for each note in a range to be played is mounted in the rear of screen 10. The bulbs 20 may be colored to denote sharps and flats, if desired. Each bulb 20 has a light focusing channel 22 to illuminate each note on the scale staff 18 on face 16 of screen 10 corresponding to a particular key on keyboard 24 of piano 14.

As shown in FIG. 1 a keyboard cover 26 may be used to cover a portion of the keyboard 24 corresponding to the range of notes available on staff 18 so that the student will be forced to play without watching his hands.

Figure 7:
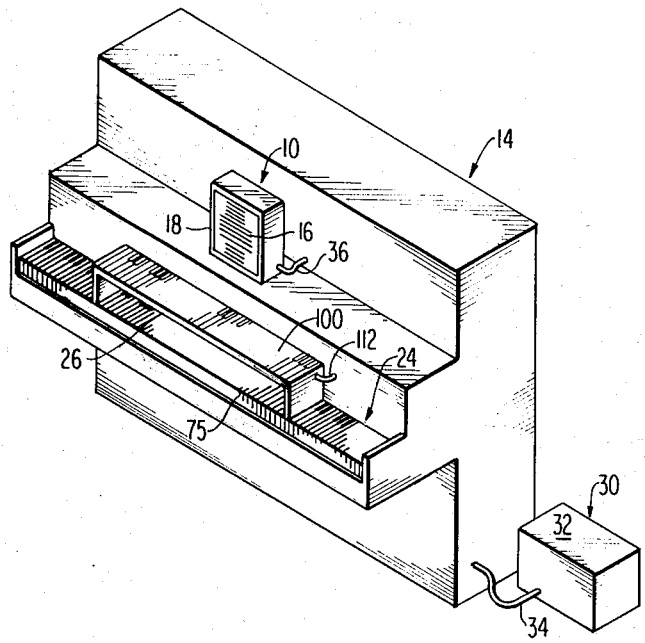
FIG. 7 is a plan view of a piano with the visual scale representation and keyboard representation of this invention mounted thereon.
Figure 8:
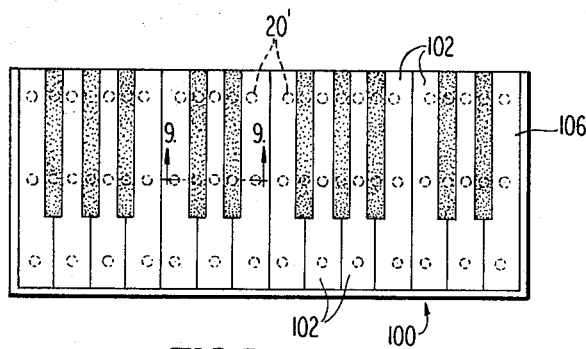
FIG. 8 is a fragmentary top view of the keyboard representation.
Figure 9:
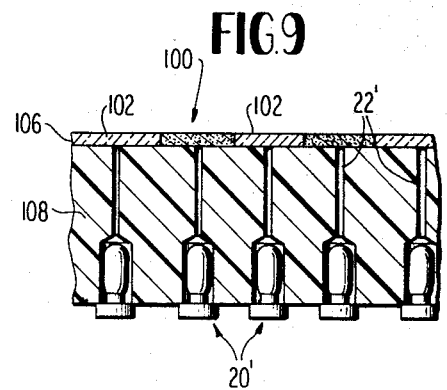
FIG. 9 is a fragmentary sectional view taken along line 9—9 of FIG. 8.

With attention to FIGS. 7–9, an embodiment of this invention may feature, in addition to visual scale screen 10, a keyboard representation 100 mounted on keyboard cover 26, and oriented over keyboard 24 so that each key 102 corresponds to an instrument key on keyboard 24.

The keyboard representation 100 includes a screen 106 which has keys 102 inscribed thereon. Screen 106 is preferably of translucent plastic material. At least one subminiature light bulb 20' for each key in the range to be played is mounted below screen 106 in a milled plate of insulating material 108. Each bulb 20' has a light focusing channel 22' to illuminate each key 102 on the keyboard representation 100 corresponding to the particular key 78 on keyboard 24 of piano 14.

As shown in FIGS. 8 and 9, in the preferred version a plurality of lights 20' are utilized for each key. Although FIG. 8 shows three sets of lights 20' for keyboard representation 100, it will be obvious to those skilled in the art that any number of lights desired may be utilized. In addition, colored lights may be utilized if desired.

Figure 4:
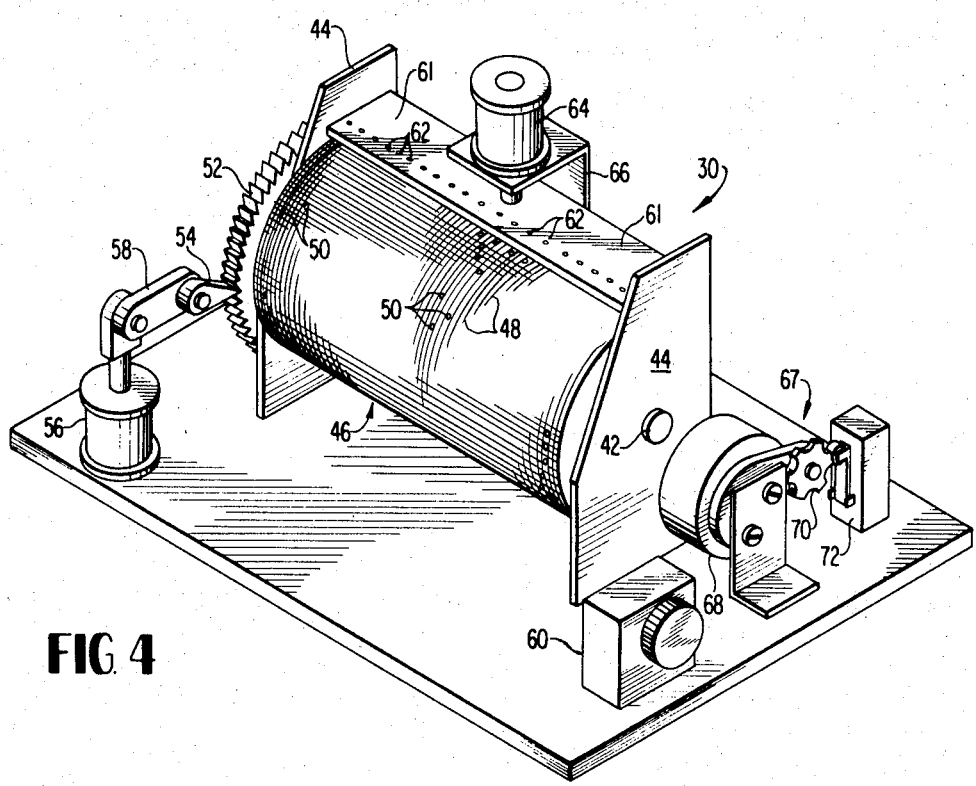
FIG. 4 is a plan view of a preprogrammed signal device which projects the visual keyboard problems to be executed by the student.

The preprogrammed signal unit 30 shown in FIG. 4 may be self-contained in a case 32 as shown in FIG. 1 and removably connected by lead 34 to the circuitry within a piano and to lead 36 to screen 10 as will be subsequently explained. Unit 30 may also be connected to the keyboard representation 100 through lead 112 as will also be subsequently explained. In the alternative unit 30 may be mounted within piano 14.

With attention to FIG. 4, the signal unit 30 may be described as follows. A drum 40 of insulating material is mounted on shaft 42 and rotatably supported in a mounting bracket 44. Metal mesh 46 surrounds the external surface of the drum 40 and divides the surface into a series of squares, which define mutually spaced pin receiving slots 48 in the surface of drum 40. Each slot 48 in the axial direction along drum 40 corresponds to a key on keyboard 24 within the desired playing range under cover 26, and each axial row corresponds to a separate student exercise.

Metal pins 50 are inserted into slots 48. Each pin 50 contacts the mesh 46 and extends upwardly from its slot on the surface of drum 40 and the mesh 46. In a preferred embodiment four octaves of the keyboard or forty-nine keys are utilized for student instruction. Therefore, forty-nine squares extend in the axial direction on drum 40 defining forty-nine pin receiving slots to make up a single row of squares 48.

Drum 40 may be rotated to change exercises by any conventional drive system. A preferred system is shown in FIG. 4 and described as follows. Gear 52 is rigidly and coaxially mounted on shaft 42. Drum 40 is advanced by the action of a ratchet pawl 54 with gear 52. A solenoid 56 mounts biased pivot arm 58 which in turn mounts pawl 54. A variable interval timer 60 controls rotation of the drum 40 by energizing solenoid 56 at preselected intervals of, for example, one to ten times per minute. When timer 60 energizes solenoid 56 pivot arm 58 and ratchet pawl 54 advance, by one tooth, gear 52, which action causes drum 40 to rotate a corresponding amount. When the solenoid is de-energized the bias on arm 58 returns the arm to its rest position shown in FIG. 4 until the solenoid 56 is energized again.

Panel 61 is constructed of insulating material and is slidably mounted on bracket 44 adjacent drum 40. Panel 61 mounts a plurality of spring contacts 62. Contacts 62 are mounted parallel to the axis of drum 40. Each contact 62 corresponds to a key on a keyboard 24, and a light bulb 20 in screen 10 and at least one light bulb 20 in keyboard representation 100. Contacts 62 are adapted to engage pins 50 in slots 48, when the pins 50 are disposed thereunder, without touching mesh 46. Solenoid 64 mounted on bracket 66 engages panel 61. Solenoid 64 is also energized by timer 60 so that when the timer 60 causes solenoid 56 to advance drum 40, solenoid 64 is energized to simultaneously move contact 62 from engagement with pins 50.

It will be obvious to those skilled in the art that drum 40 may optionally be rotated by a variety of different devices other than solenoid 56, arm 58, and pawl 54. For example, a motor 53 and ratchet gear 54 may be used either to supplement the action of the pivot arm 58 and pawl 54 or in place thereof. This alternate drive system is shown at FIG. 6. When utilized, timer 60 will energize motor 53 in the same manner as solenoid 56 to advance the drum 40.

The pulsating voltage which flashes bulbs 20 and 20' on screen 10 and representation 100 respectively, may be provided by any conventional flasher circuit. A preferred flasher 67 shown in FIG. 4 is a gear motor 68 which is utilized to drive a pulse wheel 70 which acts on a microswitch 72 to generate a pulsating voltage for light bulbs 20 and 20'.

With attention to FIG. 3, each key 78 on keyboard 24 actuates a switch 80. Leaf switch 82 normally engages a blade 84 coupled to spring contacts 62, pins 50 and mesh 46 to the flasher 67. When the key 78 is depressed, leaf 82 is disconnected from blade 84 and contacts blade 86 coupled to a steady, nonpulsating voltage.

With attention to the schematic illustration of FIG. 2, if visual screen 10 is intended to be utilized without keyboard representation 100, the circuit diagram corresponds to FIG. 2. When switch 90 is closed, current from source 92 applies a voltage of, for example, 24 volts to timer 60, blade 86, and flasher circuit 67. Motor 68 in circuit 67 acting through pulse wheel 70 and microswitch 72 causes the application of a pulsating voltage to mesh 46 through spring wiper arm 92. When pin 50 engages spring contact 62 in panel 61 the pulsating voltage on mesh 46 is also applied, through blade 84 and leaf 82 to bulb 20 causing the said bulb to flash.

When key 78 is depressed, leaf 82 switches from blade 84 to blade 86 which action bypasses flasher circuit 67 and causes the application of a steady voltage to bulb 20. The action of switch 80 responsive to the depression of key 78 changes flashing light 20 to a steady light.

Following the expiration of a preset period of time, timer 60 energizes solenoids 56 and 64. Solenoid 56 acting on bias arm 58 and pawl 54 causes the drum 40 to advance in a counter-clockwise direction. Solenoid 64 energized by timer 60 acts on panel 61 to separate contacts 62 from pins 50 while the drum 40 rotates to align the next row of pins 50. When the timer 60 de-energizes solenoid 56 the biased arm 58 returns pawl 54 to a rest position and blade 61 is lowered to place contacts 62 in engagement with pins 50 disposed thereunder.

Figure 10:
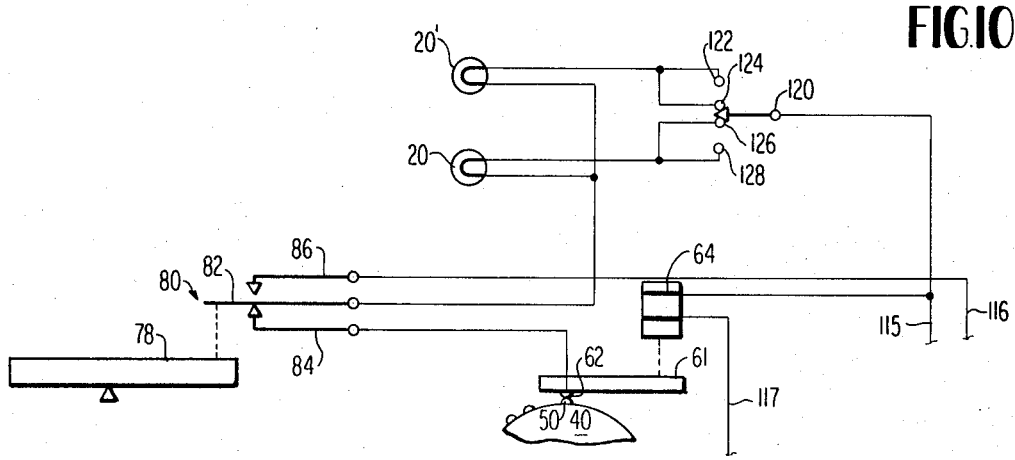
FIG. 10 is a circuit diagram showing a portion of the schematic illustration of FIG. 2 and showing additional modifications of this invention.

The circuit illustrated in FIG. 10 is identical to that pictured in FIG. 2 with the exception of modifications to be hereinafter described. It will be noted that only a portion of the circuit illustrated in FIG. 2 necessary to show the modifications has been incorporated in FIG. 10. Leads 115 and 116 are connected to the power source 92 and lead 117 is connected to the timer 60 as shown in FIG. 2.

With attention to the circuit diagram of FIG. 10, a manually operated, three-position switch 120 is utilized to complete the electrical circuit and to selectively actuate either light 20 or light 20', or both lights 20 and 20' simultaneously. If switch 120 connects contacts 122 and 124, only lights 20' in keyboard representation 100 will be actuated. If key 78 is depressed, leaf 82 switches from blade 84 to blade 86 which action bypasses flasher circuit 67 and causes the application of a steady voltage to bulb 20'.

If switch 120 connects contacts 124 and 126 both lights 20 and 20' will be actuated, and depression of key 78 will, as above described, cause leaf 82 to switch from blade 84 to blade 86 thereby bypassing the flasher circuit 67. This will cause the application of a steady voltage to lights 20 and 20' simultaneously.

In the event only visual screen 10 in the device of this invention is intended to be utilized, switch 120 connects contacts 126 and 128. In this position the circuit illustrated in FIG. 10 functions identically as described above in relation to the circuit pictured in FIG. 2.

In summary, the instructor preprograms the signal device 30 by pushing pins 50 in slots 48 corresponding to those keys 78 he wishes to have played. Each axial row corresponds to a separate exercise. He also sets switch 120 in the position desired. When the device of this invention is actuated, a row of pins 50 is rotated into engagement with contact 62 which causes lights 20 or 20' corresponding to the pins present in the row to display on screen 10 or the screen 106 of keyboard representation 100 a set of flashing notes or keys. The display continues to flash until the corresponding key 78 on keyboard 24 is depressed. The bulbs 20 or 20' then change from flashing to a steady light.

At the expiration of the preset period of time, timer 60 energizes solenoids 56 and 64. The solenoid 56 then rotates drum 40 to the next axial row of pins 50, representing the next exercise, and simultaneously disconnects the existing display on the screen 10 and on the screen 106 of keyboard representation 100.

In this manner a series of individual exercises may be displayed sequentially at any speed desired to accommodate pupils from beginners to the more advanced.

If the instructor wishes to teach his student only sight reading, switch 120 is moved to connect the contacts 126 and 128 and only screen 10 is actuated.

If the instructor wishes to teach his pupil to play by ear, switch 120 is rotated to connect contacts 122 and 124 and actuate only keyboard representation 100.

If the instructor wishes to utilize both the keyboard representation 100 and the visual screen 10 simultaneously, he need only select, with switch 120, contacts 124 and 126.

Although the foregoing has described the use of the device of this invention with keyboard instruments it will be obvious that the invention is not limited thereto but may be incorporated within the scope thereof for use with the keyboard and footpedals of either a piano and/or an organ.

For example, in FIGS. 1 and 1A there is illustrated foot pedals 100 and 100a which form a part of a piano 14 or organ 14a on which foot pedals may be coupled into the signal unit 30 and the flasher circuit 67 similarly as the key 78 is coupled thereto in FIG. 2. Thus, the light 20 associated with each pedal is indicated on the screen 10 and actuated upon closing of a contact corresponding to contact 62 whereby the light is coupled to the pulsating voltage in the flasher circuit to flash. Upon depression of the appropriate pedal, the light would be connected to the non-pulsating voltage in the flasher circuit and lit continuously indicating depression of the proper organ pedal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A teaching device for a musical instrument having a keyboard to teach pupils keyboard proficiency comprising:

a screen mounted on said instrument and having a keyboard representation of keys inscribed thereon and a plurality of lights disposed thereunder to form, when lighted, a visual display of keys on said keyboard representation, at least one light being oriented in relation to each of said keys on said keyboard representation so that when said lights are lighted, a plurality of keys within a predetermined range are displayed on the keyboard representation on said screen;

signal means coupled to a power source and coupled to said lights for lighting only a predetermined number thereof for a predetermined length of time to display a musical exercise on said screen, said signal means including a rotatable cylindrical drum having a plurality of axially extended rows of contact receiving slots, each row corresponding to a musical exercise and each slot in each row corresponding to a key on the keyboard;

a plurality of the first electrical contacts, each contact adapted to be coupled to a key on the keyboard and to the corresponding light on said screen, said contacts disposed in a row axially aligned and mounted adjacent said drum;

a plurality of second electrical contacts disposed in preselected slots in a plurality of successive rows on said drum, said second contacts adapted to be coupled to a source of electrical energy, each row of said second contacts adapted to engage said corresponding contacts when said row is disposed immediately adjacent said first contacts;

switch means coupling said first contacts to each of said lights and to the key on said keyboard corresponding to each light for displaying on said screen the predetermined number of lights in a first array, and for displaying each of said lights in a second array responsive to depression of the keys corresponding to the keys displayed on said screen;

advancing means coupled to said signal means for advancing said signal means to successively display a series of individual musical exercises on said screen;

timer means coupled to said advancing means for actuating said advancing means following the expiration of a preset period of time.

2. The signal means of claim 1 wherein the drum is constructed of an insulating material having axially aligned rows of apertures therein and a metal mesh surrounding the external surface thereof, said mesh being disposed to define with the apertures, the contact receiving slots;

said second electrical contacts comprising a plurality of metal pins adapted to be inserted into the slots contacting the mesh and extending outwardly therefrom; and a metal wiper blade coupled to the power source and mounted adjacent the drum, said blade adapted to contact the mesh.

3. A teaching device for a musical instrument having a keyboard to teach pupils to read music and play visual exercises thereon, and to recognize the keys on the keyboard corresponding to the notes played comprising:

a first screen mounted on said instrument having a musical scale inscribed thereon and a plurality of lights disposed therein to form, when lighted, a visual display of music on said screen, each light being oriented in relation to the musical scale to correspond to a different musical designation so that when said lights are lighted a plurality of notes within a predetermined range are displayed on the scale on said screen;

a second screen mounted on said instrument having a keyboard representation inscribed thereon and a plurality of lights disposed therein to form, when lighted, a visual display of keys on said keyboard representation, at least one light being oriented in relation to each of said keys on said keyboard representation so that when said lights are lighted a plurality of keys within a predetermined range are displayed on the representation on said screen;

signal means coupled to the power source and adapted to be coupled to the lights in said first and said second screens for lighting only a predetermined number thereof for a predetermined length of time to display a musical exercise on said screens;

switch means coupling said signal means to each of said lights and to the key on said keyboard corresponding to each light for displaying on said screens a predetermined number of lights in a first array and for displaying each of said lights in a second array responsive to depression of the keys corresponding to the lights displayed on said screens;

three-position selector means coupled to said switch means and coupled to the power source for completing the circuit through the predetermined number of lights in at least one screen.

4. The device of claim 3 wherein said signal means further comprises a plurality of sequentially arranged electrical contacts, each sequence of contacts corresponding to a musical exercise for display on said screens;

advancing means coupled to said signal means for advancing said signal means to successively display a series of individual musical exercises;

and timer means coupled to said advancing means for actuating said advancing means following the expiration of the preset period of time.

5. The device of claim 4 wherein the signal means comprises:

a rotatable cylindrical drum having a plurality of axially extending rows of contact receiving slots, each row corresponding to a musical exercise and each slot in each row corresponding to a key on the keyboard;

a plurality of first electrical contacts, each contact coupled to a key on a keyboard and to corresponding lights on each of said screens, said contacts displayed in a row axially aligned and mounted adjacent said drum;

a plurality of second electrical contacts disposed in preselected slots in a plurality of successive rows on said drum, said second contacts adapted to be coupled to a source of electrical energy, each row of said second contacts adapted to engage said corresponding first contacts when said rows are disposed immediately adjacent said first contacts.

6. The signal means of claim 5 wherein the drum is constructed of an insulating material having axially aligned rows of apertures therein and a metal mesh surrounding the external surface thereof, said mesh being disposed to define, with the apertures, the contact receiving slots; said second electrical contacts comprising a plurality of metal pins adapted to be inserted in the slots, contacting the mesh and extending outwardly therefrom; and a metal wiper blade, coupled to a power source and mounted adjacent the drum, said blade adapted to contact said mesh.

7. The device of claim 4 wherein the advancing means comprises a gear coaxially mounted at an end of said drum; a one-way ratchet pawl adapted to engage the teeth of said gear to drive said gear and said drum; a solenoid; a biased pivotal arm connecting said pawl and said solenoid so that when said solenoid is energized said arm and said pawl advance said gear and drum.

8. The device of claim 4 wherein the advancing means comprises a drive gear coaxially mounted at an end of said drum; an electric motor, having an output shaft, mounted adjacent said gear; a ratchet gear mounted on an output shaft and engaging the drive gear so that when the motor is energized said ratchet gear advances said drive gear and said drum.

9. The device of claim 3 wherein the switch means comprises a plurality of first terminals and a plurality of second terminals each of said first and second terminals mounted adjacent a key on said keyboard, each of said second terminals coupled to a power source; a plurality of switches, each switch carried by a key on said keyboard disposed adjacent said first and second terminals, each of said switches normally engaging each of said first terminals and coupled to the corresponding lights on said screens; a flasher means coupling said first terminal to the power source so that when the device is actuated a pulsating voltage is applied through each first terminal to each light in said first array until the corresponding key is depressed which key then displaces the switch from the first terminal to the second terminal so that a steady voltage is applied to each light in the second array.

10. The device of claim 9 wherein the flasher means comprises:

a motor adapted to be coupled to a power source;

a pulse wheel engaging the output shaft of said motor and adapted to be driven thereby;

a microswitch coupled to the power source, and to said first terminal, said microswitch operably engaging said pulse wheel, so that as said motor drives said pulse wheel said microswitch opens and closes to apply a pulsating voltage at said first terminal.

References Cited

UNITED STATES PATENTS

| | | | |
|---|---|---|---|
| 1,728,191 | 9/1929 | Votey | 84—478 |
| 2,547,535 | 4/1951 | Pierce et al. | 84—478 |
| 3,377,716 | 4/1968 | Schmoyer | 84—478 |
| 3,379,087 | 4/1968 | Weitzner | 84—478 |
| 3,577,824 | 5/1971 | Lavan | 84—478 |

RICHARD B. WILKINSON, Primary Examiner

L. R. FRANKLIN, Assistant Examiner